United States Patent [19]

Lambert, Jr.

[11] 4,022,335

[45] May 10, 1977

[54] SPREADING-UNLOADING ROTARY SWEEP APPARATUS OF THE HOLE-FORMING SLEEVE TYPE

[75] Inventor: Charles F. Lambert, Jr., Louisville, Ky.

[73] Assignee: Clayton & Lambert Manufacturing Co., Buckner, Ky.

[22] Filed: July 21, 1975

[21] Appl. No.: 597,518

Related U.S. Application Data

[63] Continuation-in-part of Ser. No. 464,124, April 25, 1974, abandoned.

[52] U.S. Cl. .................... 214/17 CB; 214/17 DB
[51] Int. Cl.$^2$ .................. B65G 65/32; B65G 65/38
[58] Field of Search .......... 214/17 R, 17 D, 17 DA, 214/17 DB; 222/404, 405

[56] References Cited

UNITED STATES PATENTS

| | | | |
|---|---|---|---|
| 2,719,058 | 9/1955 | Van Dusen | 214/17 DB |
| 3,297,177 | 1/1967 | Zeiter | 214/17 DB |
| 3,358,856 | 12/1967 | Weibull | 214/17 DB |
| 3,438,517 | 4/1969 | Steffen | 214/17 DB |
| 3,456,818 | 7/1969 | Massey | 214/17 DB |
| 3,908,839 | 9/1975 | Menaut | 214/17 DA |

FOREIGN PATENTS OR APPLICATIONS

| | | | |
|---|---|---|---|
| 1,250,360 | 5/1964 | Germany | 214/17 DB |
| 1,780,062 | 12/1958 | Germany | 214/17 DB |

*Primary Examiner*—Trygve M. Blix
*Assistant Examiner*—Jesus D. Sotelo
*Attorney, Agent, or Firm*—Arthur F. Robert

[57] ABSTRACT

A reversible rotary sweep has a single railless troughless contemporaneously reversible 16" OD horizontal long auger and a depending holeformer composed of a 19½" OD depending short auger and a surrounding 21" ID concentric sleeve. In unloading, a substantial portion of the unloading stream of silage normally flows radially inward along opposite sides of a vertical "unloading plane", extending tangentially to the unloading side of the auger. The upper end portion of the depending sleeve presents a silage overflow edge, which extends slightly below the horizontal bottom tangential plane of the long auger. Horizontally, the overflow edge is long enough to extend from the inner side edge of the unloading stream through the unloading plane to the outer side edge of the stream. As a consequence, the discharging silage, on both sides of said unloading plane, is free to cascade into the sleeve in a free-flowing substantially unobstructed condition. In the preferred embodiment, this is accomplished by making the diameter of the sleeve correspondingly larger than the diameter of the long auger. The diameter of the depending auger is likewise increased to provide a peripheral speed greater than that of the long auger and thus insure the removal of unloading silage as fast as it is received. These increases in diameter not only promote smooth and efficient unloading and demote jamming and bridging but also simplify the auger drive mechanism because both augers can be driven at the same rotational speed. In other embodiments of this invention, a free unloading flow can be obtained by offsetting the long auger rearwardly, relative to the forward or advancing movement of the unloading sweep and auger. Operational improvement is further promoted, during unloading, by terminating the flighting of the long auger adjacent the overflow edge and, during filling, by extending the non-overflow portion of the sleeve upwardly to reduce the blowing of incoming silage back into the hole.

10 Claims, 9 Drawing Figures

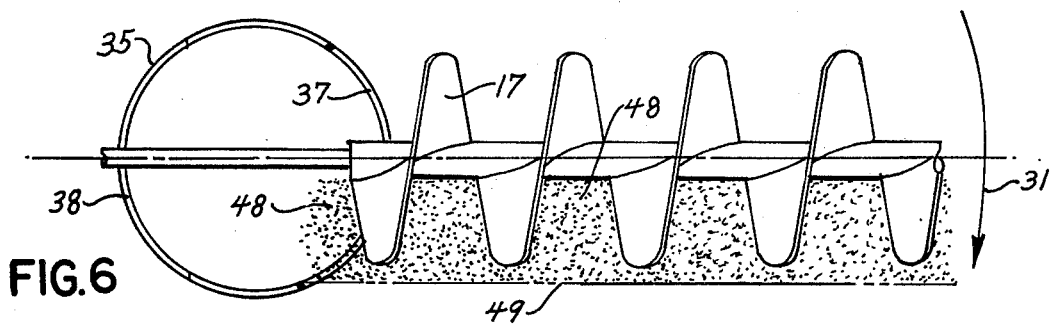
FIG.6
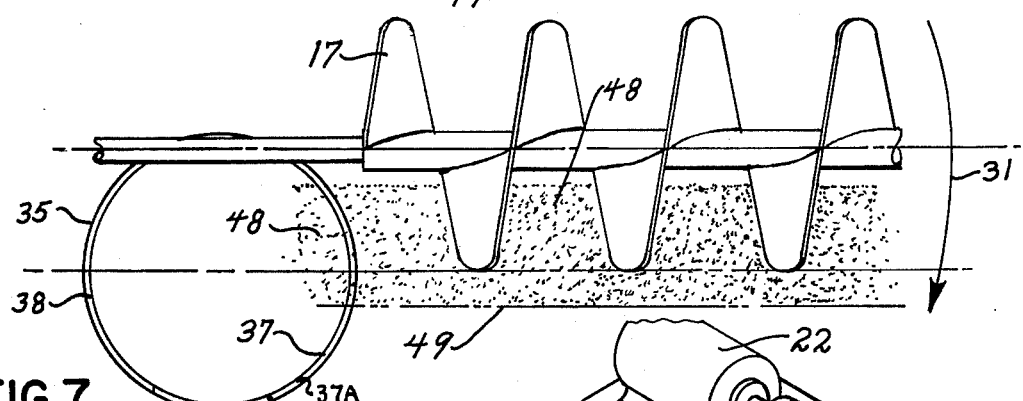
FIG.7
FIG.9
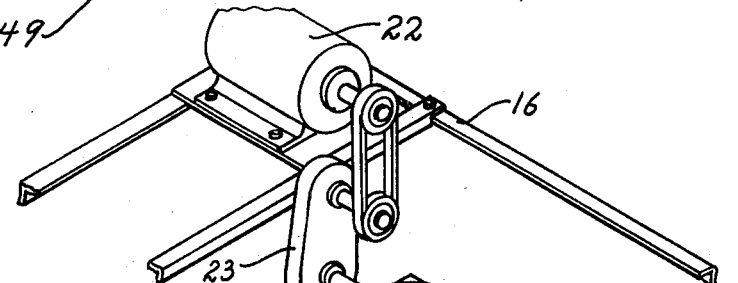
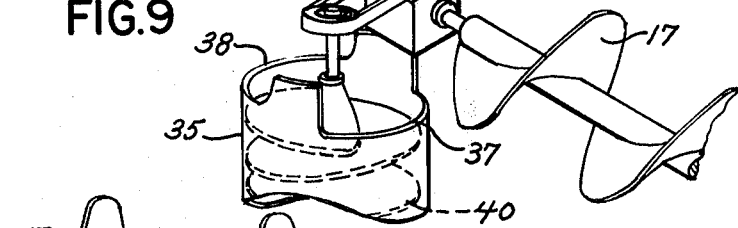
FIG.8

SPREADING-UNLOADING ROTARY SWEEP APPARATUS OF THE HOLE-FORMING SLEEVE TYPE

CROSS REFERENCE TO RELATED APPLICATIONS

This application is a continuation-in-part of my application Ser. No. 464,124, filed Apr. 25, 1974, now abandoned. My applications Ser. No. 542,222 filed Jan. 20, 1975, now U.S. Pat. No. 3,924,761 granted Dec. 9, 1975 and Ser. No. 425,308 filed Dec. 17, 1973, now U.S. Pat. No. 3,908,840 granted Sept. 30, 1975, respectively, disclose: a fully exposed hole forming auger; and a hole-former composed of a sleeve with or without a sleeve-enclosed auger.

BACKGROUND OF THE INVENTION

1. Field Of The Invention

This invention relates to a silage spreading-unloading rotary sweep apparatus of the hole-forming sleeve type which is used in clyindrical silage-storage tanks or silos.

2. Description Of The Prior Art

Spreading-unloading rotary sweep apparatus of the depending hole-forming sleeve type are commonly used in silage-storage tanks, wherein they function: during a silo filling or loading operation, to spread incoming silage more or less uniformly throughout the cross-sectional area of the tank and contemporaneously form a vertical silage-discharge hole extending centrally through the rising column of silage; and, during a silo unloading operation, to remove silage from the top of the stored column and direct it inwardly toward and into said discharge hole. In some cases, where the augers are spaced above the sleeve, the inwardly flowing silage misses the hole at intervals; in other cases, the unloading silage bridges across the mouth of the discharge hole, all of which is objectionable.

The U.S. patent to Hazen U.S. Pat. No. 3,075,657 granted Jan. 29, 1963 discloses a horizontal rotary sweep mounted on a ring gear in a silo for tracking rotation about the vertical axis of the gear. It has a single long auger which spreads by overflowing a long stepped trough under it and which cooperates with a parallel adjacent rail to unload. It is also provided, under the inner end of the long auger, with a center hole-former, which is short, i.e. of short length in comparison to the usable storage height of any given silo in which it is intended to be used. This short hole-former is in the form of a vertical cylinder closed at both ends and arranged to depend 2 foot to 5 foot from the sweep frame along the common centrally-disposed vertical axes of the ring gear and the sweep unit. This hole-former must be manually removed from the hole before the unloading operation can be instituted.

The U.S. Zeiter U.S. Pat. No. 3,297,177 granted Jan. 10, 1967 discloses a rotary sweep having parallel double long augers arranged so that their outer sides spread during filling while their inner sides cooperate to unload between them. Zeiter's sweep is also provided with a hole-former under the inner ends of his long augers. The center hole-former shown in FIGS. 1–11 comprises: (1) an outer vertically short round hole-forming cylinder of one relatively large diameter; (2) an inner vertically shorter square unloading conduit of such relatively smaller cross-section that its entire periphery is inwardly spaced from the bore of the outer cylinder; and (3) a top comprising a fixed outerpart closing the ceiling space between the outer cylinder and the square conduit and a square lid for closing and opening the top of the square conduit during filling and unloading respectively.

In FIGS. 12–15, Zeiter has a single round hole-forming cylinder and a horizontally slidable flat lid for top closing and opening purposes. Zeiter's hole-former eliminates the necessity of effecting the manual removal of the hole-former before the unloading operation can be instituted. Since hole-formers sometimes jam in the hole during unloading, due to the narrowing of the hole as a result of the weight of the silage above the point where the jamming occurs, Zeiter's hole-forming cylinder is provided with a series of vertically-arranged horizontally-spaced knives attached to and projecting downwardly from the lower end of the cylinder.

The German "Fella" patent No. 1,250,360 published Sept. 14, 1967 discloses a silo storage and unloading device comprising: a silo 1; a center discharge hole provided by an upright series of progressively smaller telescopic sections beginning with section 3 of the largest diameter at the bottom and rotatable section 8 of the smallest diameter at the top; and a diametric silage unloader extending horizontally across the silo with its center mounted on the rotatable top telescopic section 8, one radius section of the unloader carrying a drive wheel which rotates the unloader horizontally while the other radius section of the unloader carries an endless conveyor or "fork chain" 10, the lower run of which sweeps silage lying under its bottom side from the top of the column into a side opening in the top telescopic section 8.

The Henry U.S. Pat. No. 2,110,298 shows a powder unloader using curved scrapers to scrape powdery material from top of a vertical column and move that material inwardly to a center hole maintained by a movable vertical tube. The material drops through the center tube into a solution.

The Weibel U.S. Pat. No. 3,358,856 shows a powder spreader-unloader which, in unloading, rotates and lowers about a tall stationary center pipe having a series of square fixed openings spaced around its circumference and along its height. The unloading sweep auger moves fine grained powder (starch) inwardly and cooperates with scrapers 21 to move starch into pipe 11 where a vertical auger in the pipe scrapes the starch down through the pipe.

SUMMARY OF THE INVENTION

Objects Of The Invention

The principal objects of this invention are: to provide an improved rotary sweep apparatus which operates smoothly and quietly in a silo; to provide an improved hole-former of extremely simple and relatively inexpensive design; and to provide one which promotes the smooth and efficient removal of silage from the inner end of the unloading horizontal auger and correspondingly demotes jamming and bridging.

Statement Of The Invention

The more important objects of my invention can be achieved very simply by providing a short open-ended cylindrical hole-forming sleeve with an inner bore diameter which is substantially larger than the flighting diameter of the horizontal unloading auger and by providing the long auger side of the sleeve with an unobstructed overflow edge extending from the inner side edge of the unloading stream to the outer side edge thereof so as to permit substantially all of the unloading stream, on both sides of said unloading plane, to flow freely inward without obstruction as it approaches and cascades over the overflow edge of the sleeve. By "unloading plane", I mean that plane which is vertically tangential to the advancing side of the unloading auger.

Important objects can also be achieved by offsetting the long auger rearwardly, relative to the forwardly advancing movement of the unloading sweep, so as to direct the center of the unloading stream closer to the axis of rotation, which permits the use of a smaller sleeve. The achievement of the objects can be additionally improved by providing the larger sleeve with a depending auger which also has a diameter substantially larger than that of the horizontal auger so that the lineal speed of the periphery of the vertical depending auger is substantially higher than the corresponding speed of the horizontal auger when both have the same rotational speed. A sleeve and short auger of smaller diameters, approaching that of the long auger, may be used so long as the speed of the short auger is appreciably greater than that of the long auger. As a consequence of this higher lineal speed, the depending auger also promotes the efficient removal of silage from the inner end of the unloading horizontal auger and from the overflow edge and correspondingly demotes jamming and bridging. This smooth action of the stream renders the operation of the rotary sweep relatively smooth and quiet.

BRIEF DESCRIPTION OF THE DRAWINGS

The invention is illustrated in the accompanying drawings wherein:

FIG. 6 is a fragmentary top plan view showing the relationship between the sleeve and the long auger when the long auger protrudes slightly into the sleeve;

FIG. 7 is a fragmentary top plan view showing the relationship between the sleeve and the long auger when the latter is offset rearwardly with its unloading plane intersecting a vertical center plane of the sleeve;

FIG. 8 is a fragmentary top plan view showing the relationship between the sleeve and the auger when the latter is offset rearwardly and obliquely with its inner end rearmost and its outer end foremost; and FIG. 9 is a fragmentary perspective view of the parallel offset arrangement shown in FIG. 7 in relation to the common drive mechanism of both augers.

DESCRIPTION OF THE PREFERRED EMBODIMENT

Figure 1:
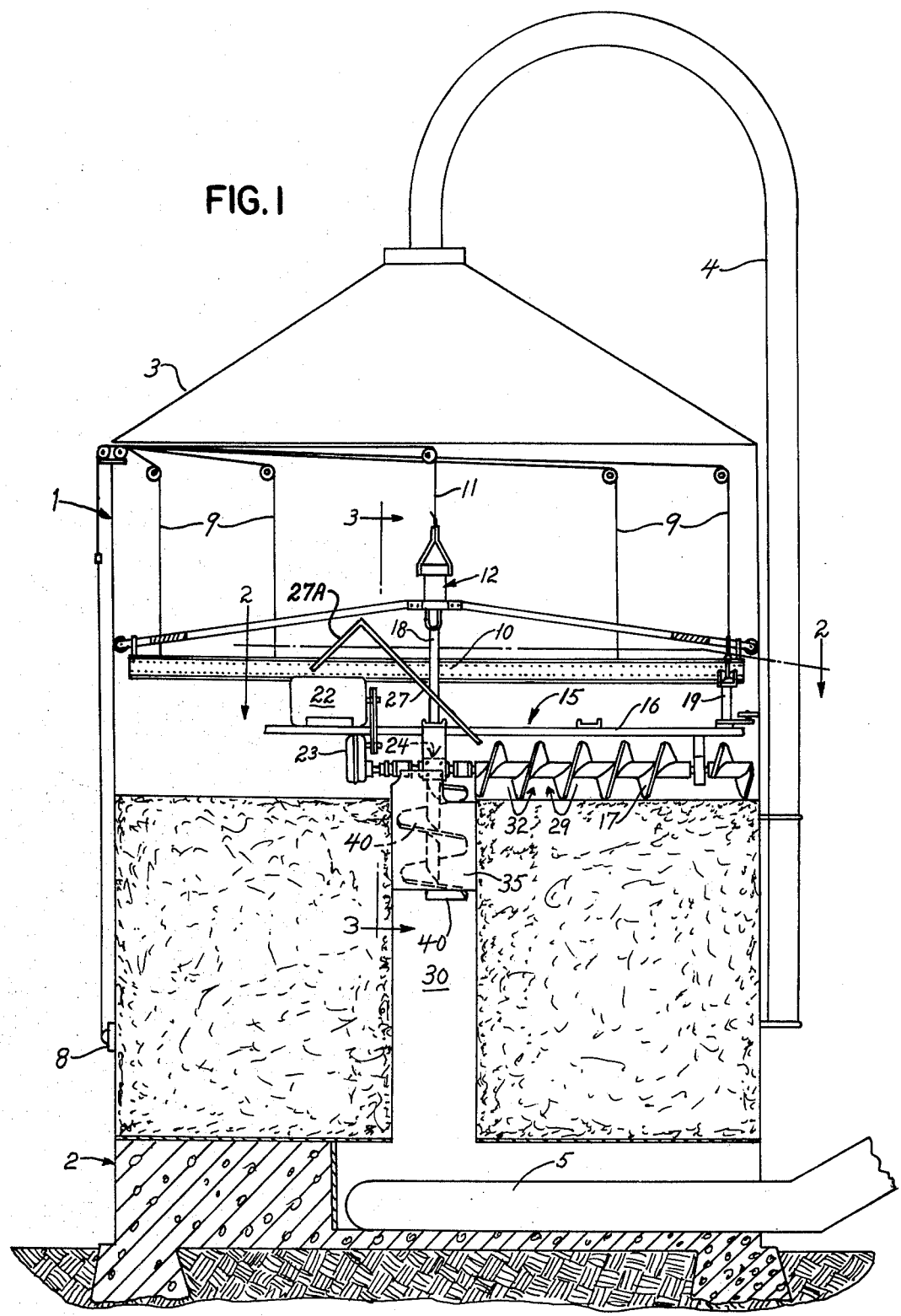
FIG. 1 is a somewhat schematic vertical section through a cylindrical silo, which contains a column of silage and a horizontal rotary sweep equipped with the preferred embodiment of my hole-former shown in side elevation.

The structure shown in FIG. 1 partially comprises: a silo; a winched vertically movable supporting assembly; a horizontally rotatable sweep; and motorized means for reversibly driving the sweep and the horizontal auger of the sweep.

Silo, Sweep And Drive

The cylindrical silo 1 has a base 2, a top 3, a silage inlet pipe 4, which directs incoming silage centrally downward through the top of the silo 1 and a discharge conveyor 5 in the base 2. The word "silage" is used herein to designate fibrous stock-feeds, such as grass, corn silage, haylage, etc., as distinguished from particulate feeds such as granular corn and other grains. The word "silo" is used herein to designate a silage storing tank as distinguished from "bins" such as "grain bins" which are used to store granular corn and other grains.

The winched supporting assembly includes an outside winch 8 not only connected through cables 9 to an inside non-rotatable ring-gear 10, which has a vertical sweep axis more or less in the vertical axis of the silo and which rises and falls within the silo in accordance with the appropriate operation of the winch but also connected through a center cable 11 to the outer stationary part of an inside two-part collector ring assembly 12 having an inner rotary part.

The horizontally rotatable sweep 15 is mounted on the supporting assembly for vertical movement with the assembly and for slow horizontal sweep rotation relative to the assembly. Sweep 15 has a horizontal sweep frame 16, reversibly motorized for slow rotation (say 1/5th to 1/10th rpm) in one direction during spreading and in the opposite direction during unloading, and a single frame-mounted spreading/unloading (S/U) radially-arranged sweep auger 17 reversibly motorized for rapid rotation (say 150 rpm) about its long radial axis in one direction during spreading and in the opposite direction during unloading. During operation, it does not require the cooperation of another silage flow part such as another auger alongside of it, any trough underneath it, or any rail or sideboard alongside of it; hence, is "fully exposed" in these respects. The inner end of the sweep 15 is suspended from the inner rotary part of the collector ring 12 by suspension 18 while the outer end of the sweep is suspended by suspension 19 from the ring-gear 10. The vertical center plane of the fully exposed long auger horizontally intersects the vertical axis of sweep rotation in the FIG. 1 embodiment.

Drive

The reversible drive means for the sweep comprises framemounted elements as follows: a reversible drive motor 20; and a tracking gear 21 geared to the ring gear 10 for tracking rotation along the ring gear. The reversible drive means for the horizontal auger 17 also comprises frame-mounted elements, viz: a reversible drive motor 22; gear reducer 23; and a gear box 24.

Filling

Figure 2:
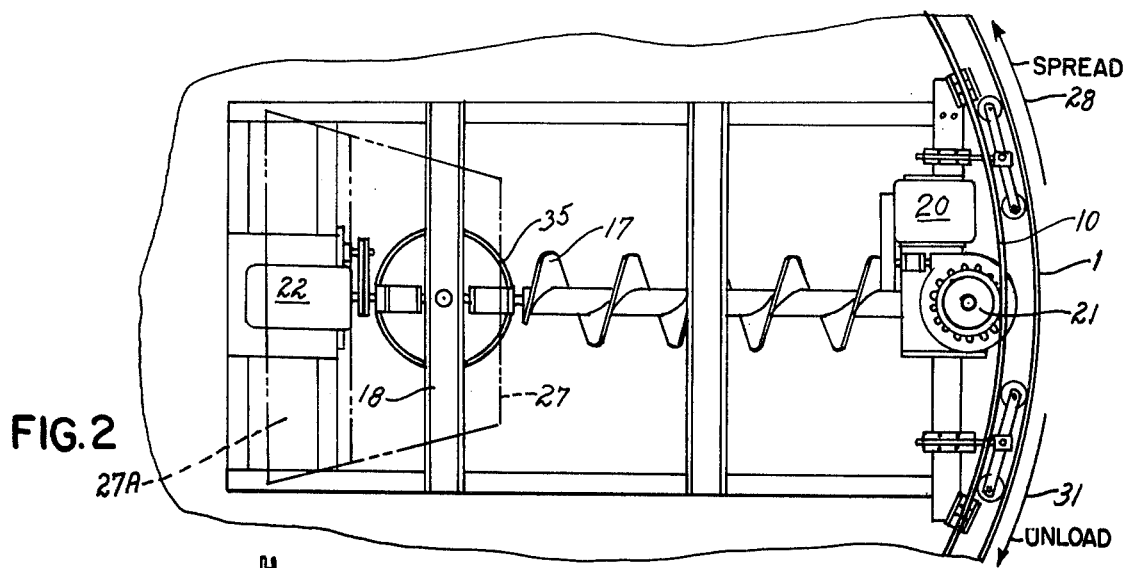
FIG. 2 is a horizontal partly broken top plan view corresponding generally to one taken along line 2—2 of FIG. 1, this view showing a diverter board in dotted lines and the tracking gear but omitting the stub auger.

In filling the silo, a stream of incoming silage is directed upwardly through pipe 4 and downwardly through the center of roof 3 and the interior of silo 1 to form a rising column of silage upon the floor of the silo. The diverter board 27 intercepts this stream and directs much of it downwardly upon the inner end portion of the auger 17. As seen in FIG. 1, the board 27 is extended obliquely downward to provide an extension 27A to reduce recycling of incoming or filling silage through the discharge hole. As seen in FIG. 2, the slowly sweeping sweep 15 sweeps counter-clockwise in the direction of arrow 28. The horizontal auger 17 rotates rapidly about its long axis in the direction indicated by arrow 29 (FIG. 1) wherein the lower half of the horizontal auger moves the silage, lying underneath the auger, toward the advancing side of the horizontal auger to form a ridge extending along and possibly spaced somewhat from that side. The horizontal auger and the sweep as a whole cooperate to move the silage within and along the advancing side of the auger both outwardly along the auger and more or less circularly in a CCW direction about the vertical axis of the silo. In this manner, the silage column is more or less uniformly spread across the interior of the silo. During this filling operation, the sweep 15 is winched upwardly as needed while a hole-former creates a center discharge hole 30 in the silage column for unloading purposes.

Unloading

In unloading the silo, the directions of sweep and auger rotation are both reversed. The sweep 15 is slowly driven to sweep about the vertical center axis of the ring gear and silo in the CW direction indicated by arrow 31 and the sweep is also winched downwardly as needed. The long auger 17 is rapidly rotated in the direction of arrow 32, which is opposite to the direction indicated by arrow 29. Consequently, the lower half of the auger 17 moves silage underneath the auger toward the now advancing unloading side of the auger. As before, the long auger an sweep cooperate to move the silage within and along the advancing side of the auger but this time such movement is directed inwardly toward and into the "front half" of the center hole 30 which directs it into discharge conveyor 5 in base 2. By "front half", I mean that half corresponding to the advancing side of the long auger.

In each of the spreading and unloading operations, the silage stream normally moves along both sides of a vertical plane extending tangentially to the advancing side of the auger 17. Since the direction of sweep rotation is one way for spreading and the reverse way for unloading, and since the lower half of the 150 rpm long auger advances in each case, the single sweep auger does not require any rails or additional augers to cooperate with it in promoting either of the outward-spreading or inward-unloading movements.

Sleeve And Auger

The preferred embodiment further includes: a vertically-arranged open-ended sleeve; and a sleeve-surrounded auger.

Figure 3:
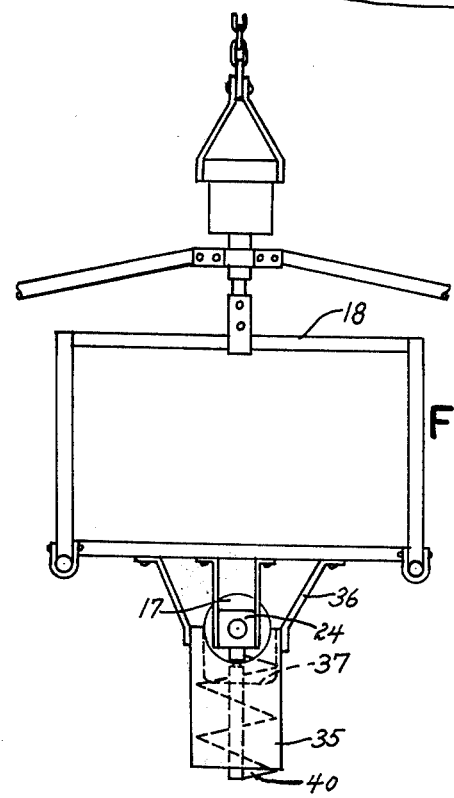
FIG. 3 is a side elevational view of the hole-forming sleeve and its support, this view corresponding generally to one taken along line 3—3 of FIG. 1.
Figure 5:
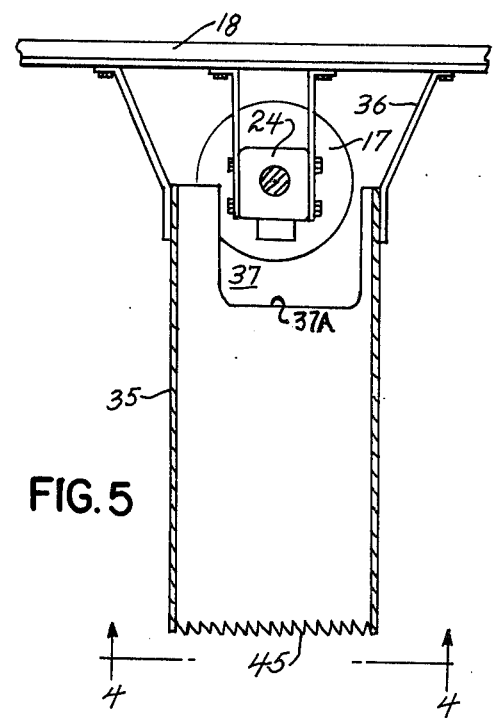
FIG. 5 shows a sleeve-only embodiment of my hole-former partly in section and partly in elevation.
Figure 4:
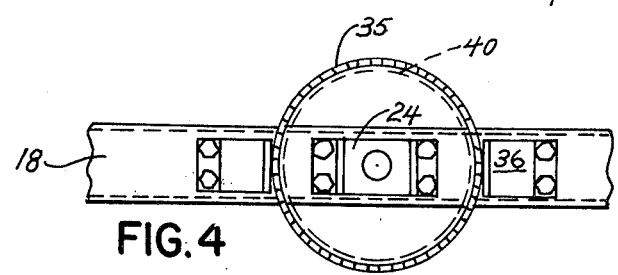
FIG. 4 is a bottom plan view of the hole-former.

The open-ended sleeve 35 is rigidly supported by an suitable means, such as "front and read" brackets 36, to depend from suspension 18 and, more particularly, from the conventional cross frame member of suspension 18. This cross frame member is located over and spaced 6 inches to 10 inches above the top of the sleeve and rigidly secured to sweep frame 16. As best seen in FIGS. 1, 3 and 5, the upper end portion of the sleeve 35 is extended upwardly to about the level of the long auger drive shaft. Diametrically opposite portions of the sleeve are secured to lower end portions of the sleeve-supporting brackets 36.

On each side of these upward "extensions", the upper end portion of the sleeve is cut away to provide: a side inlet opening 37 on the long auger side; and a "backstop" 38 on the drive side between the gear reducer 23 and gear box 24. The side inlet opening 37 is dimensioned vertically so that its bottom edge is located about 1¼ inches below the bottom tangential plane of a 16 inches long auger. It is dimensioned horizontally long enough to bridge the full width of the discharge stream.

During filling, the "backstop" 38 cooperates with the diverter board 27A to restrict the passage of incoming silage back to the discharge hole. In some cases, such silage is airborne. In other cases, it forms a ridge normally spaced outwardly from the backstop. If this ridge is not spread in time, it will increase vertically and horizontally and, in some cases, sufficiently for its inner side to reach the discharge hole and flow thereinto. The backstop requires the deposit to grow higher before it can discharge into the discharge hole and thus provides additional time for the long auger to reach the ridge and spread it harmlessly away from the discharge hole. During unloading, the backstop intercepts unloading silage thrown across the sleeve.

The open-ended hole-forming guide sleeve may be of any suitable length preferably between 1 foot to 3 feet. Preferably also its length should be such that, during unloading, the backstop will always project above the top level of the unloading silage. The sweep is highly useful but less advantageous when the entire top edge of the sleeve is horizontally level either for 360° or for 360° less the upward extensions for brackets 36.

As pointed out previously, the diameter of the sleeve 35 in FIG. 1 is substantially larger than the diameter of sweep auger 17 and provided with a side inlet opening 37 having an unobstructed overflow edge 37A extending from the inner side edge of the discharge stream horizontally through the unloading plane to the outer side edge of said stream. Now the whole width of the unloading stream, on both sides of the unloading plane, can flow freely inward without obstruction and cascade over the overflow edge into the relatively large sleeve in a free-flowing condition. For example, when using a long auger 17 having a 16 inches diameter, I have obtained excellent results with a sleeve 35 having an inside diameter of 21 inches, which is approximately 31% larger, and having the forward limit of its side inlet opening 37, on the unloading side, located substantially beyond the forward limit of the advancing side of the long horizontal auger 17. In other words, the side inlet opening has a substantial horizontal dimension on both sides of the vertical tangential plane of the unloading side of auger 17. This enables it to receive all of the silage discharging at the inner end of the auger on both sides of said plane.

The 2nd element of my preferred embodiment comprises a rotatable vertically depending auger 40 having a longitudinal center axis, corresponding to said vertical axis of sweep rotation, and means rigidly connecting auger 40 to a suitable shaft vertically depending from gear box 24 and having its inner upper end connected into the drive of auger 17 preferably for rotation at the same speed as auger 17. The upper end of the flighting of depending auger 40 preferably terminates near the gear box and substantially above the lowermost edge of the side inlet opening 37 of sleeve 35.

The diameter of vertically depending auger 40 is substantially larger than that of the horizontal long auger 17 so that, with both augers operating at the same 1:1 rotary speed, the lineal speed of the periphery of the larger depending auger will be greater than that of the horizontal auger 17. The magnitude of this increase need only be such as will insure removal of silage passing into the inlet opening 37 at a rate faster than the rate at which that silage approaches that inlet opening. This results in efficient removal and reduces any tendency of that silage to pile up or jam at the inlet opening or to bridge across the sleeve. With a horizontal auger 17 having a 16 inch diameter and with a vertical sleeve 35 having a 21 inch inside diameter, I have obtained excellent results with a vertically depending auger 40 having a diameter of 19½ inches.

The length of the vertically depending auger 40 preferably should be such that its lower end projects at least about 2 inches below the lower end of the sleeve 35. This is done primarily for hole-reaming purposes; hence, the shortest projection which will accomplish the desired hole-reaming results should be sufficient. It should suffice here to say that the length of the selected auger will depend upon the length of the selected sleeve. With a 33 inch sleeve, the auger should be 31 inches with 29 inches of the auger within the sleeve and 2 inches projecting therefrom.

Before passing, it may be noted that the depending auger 40 preferably rotates one way during spreading and in the opposite way during unloading. However, it need not rotate during the spreading operation but may merely function as a plug tending to stop the passage of incoming silage downwardly through the sleeve. In this latter event, the connection between the vertically depending auger 40 and the drive in gear box 24 will include any suitable one-way drive mechanism to drive that gear positively only during the unloading operation. Since one-way drive mechanisms are common, no further reference thereto need be made.

The pitch ratio of the flighting on the depending auger 40 should be the same as the pitch ratio on long auger 17 which usually is about 16 inches. Furthermore, the flighting of both augers should be synchronized to avoid any possibility of these flightings clashing with each other at the upper end of the sleeve.

The term "short", as applied to the depending auger, is used to indicate that said auger is short in relation to the usable storage height of any given silo in which it is intended to be used.

Operation

Since the filling operation of the foregoing structure is more or less obvious, it should suffice to say: that sweep 15 and long auger 17 normally spreads the silage more or less uniformly throughout the cross-sectional area of the silo; that the rising hole-forming sleeve 35 operates to form a center discharge hole 30 upwardly through the rising column of silage; and that the diverter board 27, its extension 27A, the backstop 38 and the depending auger 40, particularly when rotated, will substantially reduce the discharge of incoming silage downwardly through hole 30. If depending auger 40 does not rotate, it simply functions as a stationary but inefficient plug is sleeve 35. If it rotates, it tends to throw any incoming silage which drops into the sleeve upwardly out of the sleeve.

The unloading operation is conventionally performed except that the silage stream is directed through the large side inlet opening 37 of the sleeve 35. This large sleeve inlet opening thus promotes smooth and efficient unloading and correspondingly demotes jamming and bridging. Furthermore, the larger diameter of the depending auger 40 not only provides it with a relatively higher peripheral speed, which promotes smooth and efficient unloading and demotes jamming and bridging but it also enables the drive of auger 40 to be of the simplest character since both augers 17 and 40 can be driven from the same drive train at the same rotational speed.

Sleeve Only

The large sleeve 35, with its forwardly offset side inlet opening 37, should normally perform so well in the filling/spreading and unloading operations as to render the use of the depending auger 40 unnecessary although it may be desirable. However, with the omission of the depending auger, it is desirable to provide the lower end of the sleeve 35 with serrations 45, as seen in FIG. 5. The vertical edges of the serrations 45, which are located on the advancing side during unloading, preferably are sharpened to improve the ability of the slowly rotating sleeve to ream the discharge hole 30 as it descends. Deeper V-shaped serrations or square serrations may be employed, the latter preferably being also sharpened on their bottom edges.

FIGS. 6–9

FIG. 6 shows the relationship between the top of the sleeve 35, the long auger 17, and the unloading silage stream 48 when the depending auger is used. The depending auger 40 is omitted from this figure. As seen, the long auger 17 projects through the side inlet opening 37 over its bottom overflow edge; hence, its flighting must be synchronized with the flightings on the depending auger 40 to avoid clashing.

It should be understood that a portion of the unloading silage contained within the confines of auger 17 is positively driven forwardly toward and into opening 37. On the other hand, that portion of the silage stream which extends adjacent to but outside of the advancing side of the long auger is more or less impositively moved or dragged by the positively moving silage. The width of this drag flow is hard to predict in any given instance and varies under different conditions of use including different silages, different moisture contents, different adhesive contents, and the like. Consequently, while we have shown the outer limit 49 to be straight, it will be understood that this is done only for purposes of explanation and not for purposes of accurately showing the exact position of the outer limit 49 of the silage which is dragged or impositively driven. As shown, it will be appreciated that the side inlet opening 37 is made to accommodate the full width of the silage stream 48. When I made the sleeve 35 larger to permit the use of a wider side inlet opening as indicated, smooth flow conditions were achieved and jamming and bridging eliminated for all practical purposes.

FIG. 7

In FIG. 7, the long auger shaft has been offset rearwardly, in relation to the forwardly advancing face of the unloading sweep and positioned so that its unloading plane either intersects the vertical axis of the sleeve or is in the general vicinity of that axis. With this offset, the unloading silage stream flows more or less centrally into the sleeve 35. This permits the use of a smaller sleeve and retains the advantages of the larger sleeve. With a smaller sleeve, the silo holds more silage.

FIG. 8

If the auger 17 is to be offset rearwardly, I prefer the oblique arrangement shown in FIG. 8 wherein the innermost end of the auger is spaced rearwardly a distance slightly greater than its outermost end. I believe that the sweep of FIG. 8 is under less strain than that of FIG. 7 and that it has all the advantages of FIG. 7.

FIG. 9

With offset augers 17 in FIGS. 7 and 8, all FIG. 9 drive parts from motor 22 through reducer 23 to gear box 24 are offset from a vertical plane passing through the vertical center axes of the silo and the depending auger 40. The same general drive arrangement may be used with a belt 51 arranged to interconnect gear box 24 with the upper end of the shaft of depending auger 40.

The propelling faces of the flighting of the augers in FIGS. 6, 7 and 9 are shown as if they were free of silage but this of course is not so. Such faces engage and propel the silage in the conventional way.

Having described my invention, I claim:

1. A spreading/unloading rotary sweep apparatus of the hole-forming sleeve type for use in filling and unloading a given silage storage tank or silo containing a vertically movable nonrotatable supporting assembly, which has a vertical center axis, comprising:
   A. a rotary sweep mounted on said assembly for vertical raising and lowering movement therewith along said vertical center axis during respective silo filling and unloading operations, said sweep having
      1. opposite outer spreading and unloading sides, and
      2. on one side of said center axis, a single fully-exposed long sweep auger of the radius type with corresponding opposite silage spreading and unloading sides;
   B. drive means for reversibly rotating the sweep slowly about said vertical center axis of the assembly and said single sweep auger rapidly about its own long horizontal axis,
      1. said drive means being operative to rotate both the sweep and said single sweep auger
         a. in one direction with their corresponding silage spreading sides facing in the advancing direction during filling and
         b. in the opposite direction with their corresponding silage unloading sides facing in the advancing direction during unloading, the unloading stream normally flowing radially inward along opposite sides of a vertical "unloading" plane extending tangentially to the unloading side of the auger, and
      2. said single sweep auger rotating in each direction with its lower half moving forwardly toward its advancing side; and
   C. a vertically short open-ended cylindrical discharge sleeve connected to depend from the sweep in concentric relationship to said vertical center axis for vertical and rotary movements as a unit therewith,
      1. said sleeve having cylindrical outer and inner peripheral and bore walls respectively,
      2. said cylindrical peripheral wall, being operative during the silage filling operation, to form an upwardly rising discharge hole,
      3. said cylindrical bore wall, being operative during the silage unloading operation, to receive and direct the unloading silage downwardly through said discharge hole, and
      4. the upper end portion of said discharge sleeve having, on its long auger side, a silage overflow edge
         a. which is vertically spaced below a horizontal plane tangential to the bottom side of the long auger, and
         b. which extends from the inner side edge of the discharge stream horizontally through said vertical unloading plane to the outer side edge of said stream so that the whole width of the unloading silage stream cascades over said overflow edge into the sleeve in a free-flowing substantially unobstructed condition.

2. The apparatus of claim 1 wherein:
   A. the inner end of the long auger's flighting terminates adjacent said overflow edge.

3. The apparatus of claim 2 wherein:
   A. that portion of the sleeve's top end edge, which provides the upper end opening or mouth of the sleeve, on its long auger side, extends horizontally through said unloading plane and substantially across the width of the unloading stream on the outer side of the unloading plane.

4. The apparatus of claim 3 wherein:
   A. the upper end portion of said open-ended sleeve has its long auger side cut away to provide a side inlet opening with said overflow edge forming the bottom edge thereof.

5. The apparatus of claim 4 wherein:
   A. that side of the upper end portion of said open-ended sleeve, opposite the inlet and long auger side, projects substantially above the horizontal level of the bottom tangential plane of the long auger.

6. The apparatus of claim 5 wherein:
   A. the front and rear sides of the upper end portion of said open-ended sleeve extend upwardly above the level of its overflow edge on the auger side and also above the level of the top edge of its upward projection on the opposite side.

7. The apparatus of claim 2 wherein:
   A. the vertical axial plane of said single long auger extends in the immediate vicinity of the vertical axis of the sleeve; and
   B. the bore diameter of the sleeve is larger than the diameter of said single long auger, the perimeter of the upper end opening or mouth of the sleeve, on its long auger side, being large enough to extend horizontally through said unloading plane and substantially across the width of the unloading stream on the outer side of that unloading plane.

8. The apparatus of claim 7 including:
   A. a short vertical auger
      1. depending from the sweep into said sleeve for vertical movement with the sweep and sleeve,
      2. having a diameter larger than the diameter of said long auger and smaller than the bore diameter of said sleeve, and
      3. being connected to said drive means for rotation during the unloading operation in a direction, which facilitates the passage of unloading silage downwardly through the sleeve.

9. The apparatus of claim 8 wherein:

A. said drive means is connected to said long auger and depending auger to drive both augers at the same rotational speed so that the peripheral speed of the depending auger is greater than the peripheral speed of the long auger and operative to remove silage coming into the sleeve at a rate faster than the long auger delivers such silage to said sleeve.

10. The apparatus of claim 5 including:

A. a diverter board is mounted on the sweep substantially above the upper end of the sleeve in position to intercept a stream of silage fed downwardly upon it during the filling operation and to direct much of said silage downwardly upon the inner end portion of the long auger,
1. said diverter board being extended obliquely downward in the opposite direction to divert some of said intercepted silage and direct it onto the top of the rising column where it tends to form a ridge normally spaced outwardly form said sleeve.

* * * * *